April 4, 1939.  J. VAN DER MARK  2,153,217

OSCILLATION GENERATOR

Filed June 12, 1936

TO SOURCE OF
SYNCHRONIZING
SIGNALS

INVENTOR
J. VAN DER MARK
BY
ATTORNEY

Patented Apr. 4, 1939

2,153,217

UNITED STATES PATENT OFFICE 2,153,217

OSCILLATION GENERATOR

Jan van der Mark, Eindhoven, Netherlands, assignor to N. V. Philips' Gloeilampenfabrieken, Eindhoven, Netherlands, a corporation of the Netherlands Application June 12, 1936, Serial No. 84,806
In the Netherlands June 12, 1935

4 Claims. (Cl. 250—36)

This invention relates to an arrangement for generating a saw tooth voltage such as are used for scanning purposes with television transmitting and receiving systems, and more particularly to those arrangements comprising a condenser which is charged across a resistance by a source of direct voltage and discharges through a discharge tube having at least three electrodes.

According to the invention an electro-motive force derived from the condenser voltage is supplied to the grid of the tube through which the condenser discharges, said electro-motive force causing a decrease of the grid voltage with an increasing condenser voltage and being supplied through an RC-system, whose time constant is small with respect to the periodic time of the oscillations to be generated.

This arrangement provides therefore a sawtooth generator with positive feed-back and produces oscillations whose frequency and amplitude can be adjusted to the desired value independently from each other.

Figure 1:
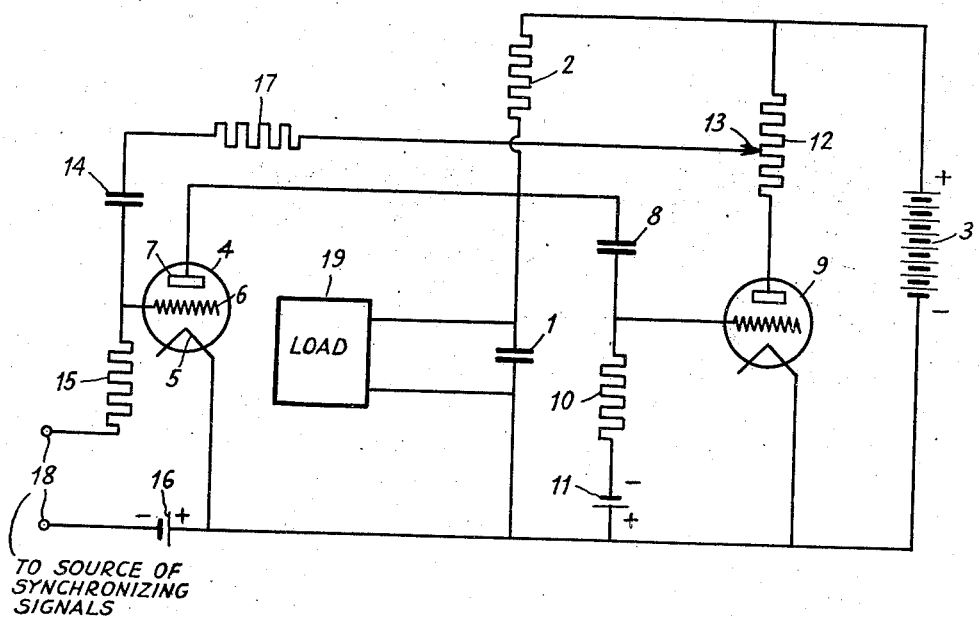
Figure 2:
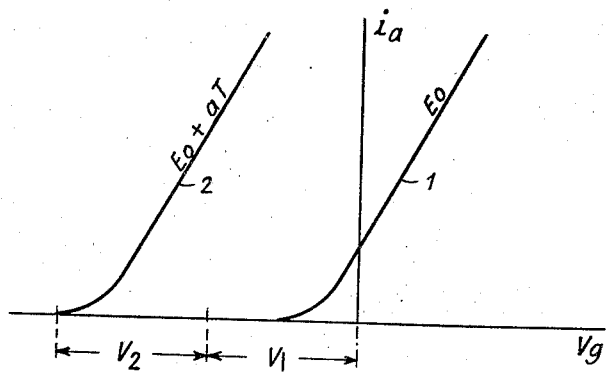

The invention will be more clearly understood by reference to the accompanying drawing, wherein Figure 1 represents one form of construction of the circuit arrangement according to the invention, which will be set out with reference to Figure 2.

Fig. 2 illustrates the anode current of the tube through which the condenser discharges, as a function of the grid voltage with different values of the anode voltage.

The arrangement represented in Figure 1 comprises the series-connection of a condenser 1, a resistance 2 and a source of direct voltage 3. The anode-cathode impedance of a discharge tube 4 comprising a cathode 5, a grid 6 and an anode 7 is connected parallel with the condenser 1. The condenser 1 has connected across it a serially connected condenser 8, resistor 10 and, if desired, a source of biasing potential 11. The cathode of the tube 9 is connected to the common junction point of the condenser 1 and the biasing potential 11, while the grid of the tube 9 is connected to the common junction point of the condenser 8 and the resistor 10. The anode of the tube 9 is connected across a resistance 12 to the positive terminal of the source of direct voltage 3, a point 13 of the resistance 12 being connected through an RC-system consisting of a serially connected resistor 17 and condenser 14 to the grid 6 of the tube 4. In addition, a source of potential 16 is connected in series with the resistance 15 and a source of synchronizing signals, between the grid 6 and the cathode 5 of the tube 4. This arrangement allows of generating oscillations having a saw tooth curve, provided the time constant of the RC-system formed by the condenser 14 and the resistance 15 be small relatively to the periodic time of the oscillations to be generated.

The operation of this arrangement is as follows:

The condenser 1 is charged across the resistance 2 by the source of direct voltage 3 and discharges through the tube 4 as soon as the relation between the grid bias of the tube 4 and the anode voltage is such that this tube allows the passage of current.

The anode voltage of the tube 4 is determined by the voltage across the condenser 1 and uniformly increases during the changing period of the condenser, whereas it returns to the initial value during the discharging period.

The characteristic curve indicating the anode current $i_a$ as a function of the grid voltage $V_g$ of the tube 4, is represented in Figure 2, the characteristic curve of the anode current-grid voltage at the beginning of the charging period being denoted by 1 and this curve at the end of the charging period, i. e., at the beginning of the discharging period being denoted by 2. From Figure 2 it appears that the anode current-grid voltage characteristic shifts to the left during the charging period and returns again to the initial position during the discharging period.

The voltage at the grid 6 of the tube 4 is determined by the bias of the source of potential 16, which may be designated by $V_1$, and by the increase and decrease of the voltage which is set up in the point 13 relatively to the cathode of the tube 9 and is supplied through the RC-arrangement 14, 15 to the grid 6. Due to this the voltage at the grid 6 of the tube 4 is dependent on the voltage set up across the condenser 1 in such a manner that the grid voltage decreases with an increasing condenser voltage, and conversely.

At the beginning of the charging period the condenser voltage has a very small value which may be represented by $E_0$. During the charging of the condenser the anode voltage of tube 4 uniformly increases and may be represented by $E_1 = E_0 + aT$ during the charging period, postulating the charging current of the condenser 1 being constant, the charging speed of the condenser being determined by $a$ and the condenser having been charged already for $T$ seconds.

Thus a current increasing with the time will flow in the anode circuit of the tube 9 during the charging period, due to which the voltage set up in the point 13 relatively to the cathode of the tube 9, decreases after T seconds from the value $E_1$ representing the direct voltage in the point 13 at the beginning of the charging period, down to the value $E_2 = E_1 - kaT$, wherein $k$ represents the ratio between the instantaneous values of the variable voltage set up in the point 13 and the condenser voltage supplied to the grid of the tube 9. Consequently, $k$ is determined by the amplification factor of the tube 9 and by the ratio between the part of the resistance 12 between the point 13 and the source of potential 3, and the total resistance 12.

During the charging period the voltage $E_2 = E_1 - kaT$ decreasing with the time, is supplied through the RC-arrangement 14, 15 to the grid of the tube 4, due to which a voltage decreasing with the time is set up across the resistance 15 as long as the current in the circuit, which comprises the part of the resistance 12 between the point 13 and the source of potential 3, the condenser 14 and the resistance 15, has not reached a constant value. The voltage set up across the resistance 15 can be determined from the equation:

$$E_2 = \frac{1}{C}\int i\, dt + iR$$

wherein the current in the said circuit is denoted by $i$, the value of the condenser 14 by C and the value of the resistance 15 by R.

After differentiation:

$$\frac{dE_2}{dt} = \frac{1}{C}i + R\frac{di}{dt}$$

or $$C\frac{dE_2}{dt} = i + RC\frac{di}{dt}$$

In this equation $$RC\frac{di}{dt}$$

may be neglected, since in the arrangement according to the invention the time constant of the RC-system consisting of the resistance 14 and the condenser 15, is small relatively to the time in which the voltage $E_2$ decreasing with the time is supplied to the RC-system.

From this equation it follows that the current through the resistance 15 attains the constant value $$i = C\frac{dE_2}{dt}$$

whereas the voltage across the resistance 15 increases to the value $$V_2 = RC\frac{dE_2}{dt}$$

or, since $E_2 = E_1 - kaT$, to the value $V_2 = -kaRC$, which value is attained before the end of the charging period of the condenser 1. Thus the voltage at the grid 6 of the tube 4 by the end of the charging period may be represente by $V_g = V_1 + V_2 = V_1 - kaRC$, said voltage being indicated in Figure 2.

As has already been observed, the anode voltage of the tube 4 uniformly increases during the charging period, due to which the anode current-grid voltage characteristic shifts to the left. As soon as the anode voltage will have attained the value $E_0 + aT$, which corresponds to the form of the characteristic curve denoted by 2 and in which T represents the charging time of the condenser 1, the relation between the grid bias of the tube 4 and the anode voltage is such that the tube 4 becomes conductive and allows the passage of current. The charging time T may be calculated from the equation:

$$-(E_0 + aT) = gV_g$$

where $g$ represents the amplification factor of the tube 4. From this equation it follows that:

$$-(E_0 + aT) = g(V_1 - kaRC)$$

$$T = -\frac{g}{a}\left(V_1 + \frac{E_0}{g}\right) + kgRC$$

As soon as the tube 4 becomes conductive the condenser 1 will discharge through the anode-cathode impedance of this tube and the anode voltage decreases, due to which the characteristic of the tube 4 indicating the anode current as a function of the grid bias will be shifted to the right. In addition, the current in the anode circuit of the tube 9 decreases, owing to which the voltage in the point 13 increases and a voltage increasing with the time is impressed through the RC-arrangement on the grid of the tube 4, thus promoting the discharge of the condenser 1, which will continue till the voltage across the condenser 1 has fallen off to a very small value $E_0$. By a proper choice of the value of the condenser 1 and the tube 4 the discharge may take place in a very short time. At the end of the discharging period the grid voltage has such a voltage that with the anode voltage $E_0$ set up at the end of the charging period, the tube 4 is blocked again. The condenser is now charged anew and the above operation is repeated.

The frequency of the generated oscillations is determined by the charging time T, assuming the discharging time may be neglected relatively to the charging time, which is the case as a rule. The value of T is determined by the equation:

$$T = -\frac{g}{a}\left(V_1 + \frac{E_0}{g}\right) + kgRC$$

and is independent of $a$, if $$V_1 + \frac{E_0}{g} = 0$$

in other words if the bias of tube 4 is selected so that $$V_1 = -\frac{E_0}{g}$$

then the first term of the right hand side of the equation becomes zero and the periodic time T is given by $T = kgRC$ and is independent of $a$. Since the value of the constant $a$ is determined by the condenser 1, the resistance 2, and potential 3, any of these may have their values changed without influencing the frequency of the generated oscillations, and affecting only the amplitude thereof. Thus this arrangement permits, with a proper adjustment of the source of potential 16, the amplitude of the generated oscillations to be varied by means of the condenser 1, the resistance 2 or the source of direct voltage 3, without affecting the frequency. The latter may be controlled by $k$, R and C either separately or jointly.

Preferably, this arrangement is used for scanning purposes in a television receiving arrangement, in which together with the picture currents synchronization impulses are received which are intended for controlling the scanning devices. In the arrangement according to the invention the synchronization impulses may be supplied as shown to the grid of the tube 4 and to the cathode of this tube by means of the terminals 18.

When the synchronization impulses are supplied to the grid, as indicated in Figure 1, a resistance 17 is preferably provided in the conductor between the point 13 and the condenser 14, due to which resistance the synchronization impulse supplied to the grid 6 brings about a larger voltage variation on the grid 6 of the tube 4. The generated saw-tooth wave may then be fed to the load 19 from across the condenser 1.

Having described my invention, what I claim as new and desire to secure by Letters Patent is:

1. In combination, an oscillator for producing electrical waves, an input control circuit for said oscillator, a load circuit connected to said oscillator, a thermionic amplifier having an input circuit connected in parallel to the load circuit, and feedback means from the thermionic amplifier to the input control circuit, said feedback means comprising time constant means whose period is small compared with the frequency of the produced electrical waves, whereby the frequency of the produced electrical waves may be varied independently of the amplitude of said waves.

2. A saw-tooth voltage wave generator comprising a condenser, means including a voltage source and a serially connected resistor for charging the condenser, a grid controlled discharge tube having a cathode, grid and anode, said condenser being coupled between said cathode and anode, means for supplying voltage through a serially connected condenser and resistance, whose time constant is small relative to the periodic time of the oscillations to be generated, to the grid of the tube in accordance with and of opposite sign to the voltage developed across the first named condenser by the charging means.

3. An oscillator as claimed in claim 2 and comprising, in addition, means to supply to the grid of the discharge tube a bias substantially equal to the voltage across the condenser at the commencement of the charging period divided by the amplification factor of the tube.

4. An oscillator as claimed in claim 2, wherein the means for supplying voltage to the grid of the discharge tube comprises a capacity-resistance coupled thermionic amplifier.

JAN van der MARK.